United States Patent [19]

Zimmer

[11] Patent Number: 4,904,231
[45] Date of Patent: Feb. 27, 1990

[54] ROCKER JOINT FOR CHAIN

[75] Inventor: George A. Zimmer, Ithaca, N.Y.

[73] Assignee: Magna International, Inc., Markham, Canada

[21] Appl. No.: 313,531

[22] Filed: Feb. 22, 1989

[51] Int. Cl.$^4$ ............................................. F16G 13/04
[52] U.S. Cl. ..................................... 474/214; 474/215
[58] Field of Search ................................ 474/214–217, 474/201, 245, 213, 153; 59/84, 88

[56] References Cited

U.S. PATENT DOCUMENTS

| | | | |
|---|---|---|---|
| 1,534,494 | 4/1925 | Belcher | 474/214 X |
| 1,638,388 | 8/1927 | Belcher | 474/214 X |
| 3,540,302 | 11/1970 | Bendall | 474/215 X |
| 3,742,776 | 7/1973 | Avramidis | 474/215 X |
| 4,010,656 | 3/1977 | Jeffrey | 474/215 |
| 4,507,106 | 3/1985 | Cole, Jr. | 474/215 |

Primary Examiner—Thuy M. Bui
Attorney, Agent, or Firm—Aubrey L. Burgess

[57] ABSTRACT

An improved rocker joint for a chain in which each pin of a pair of pins is substantially identical in cross-sectional shape. Each pin has a front and working surface defined by a first radius and a back surface defined by a single and smaller radius. Planar surfaces diverging from front to back join the front and back surfaces of the pins. The links are provided with openings to receive the pins, each opening being generally circular and having inwardly directed lugs, the lugs defining a first arc and a second and larger arc. One of the pins of the rocker joint is held against rotation in some of the links with its back surface contacting the smaller arc and also the walls of the defining lugs.

5 Claims, 2 Drawing Sheets

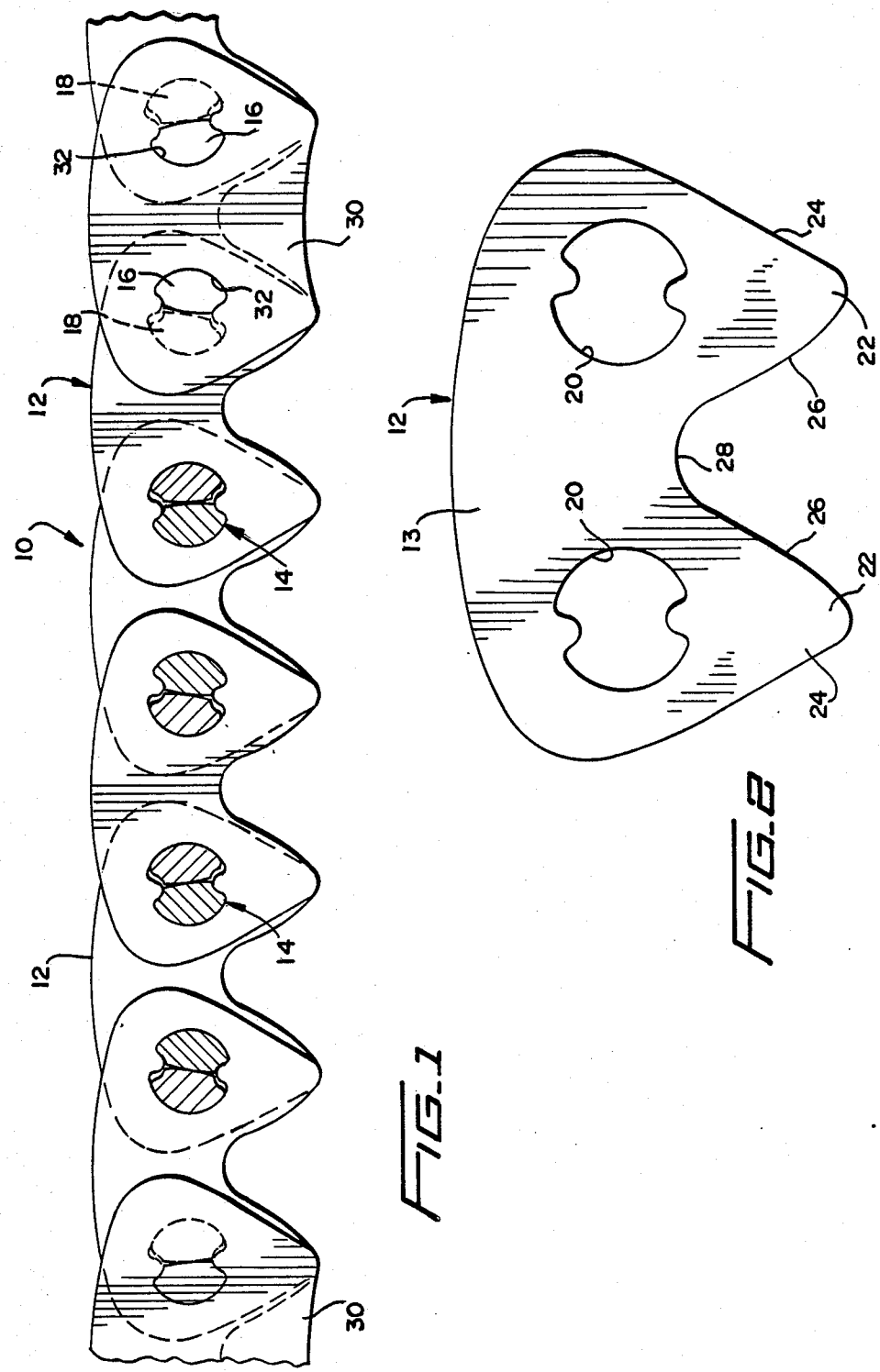

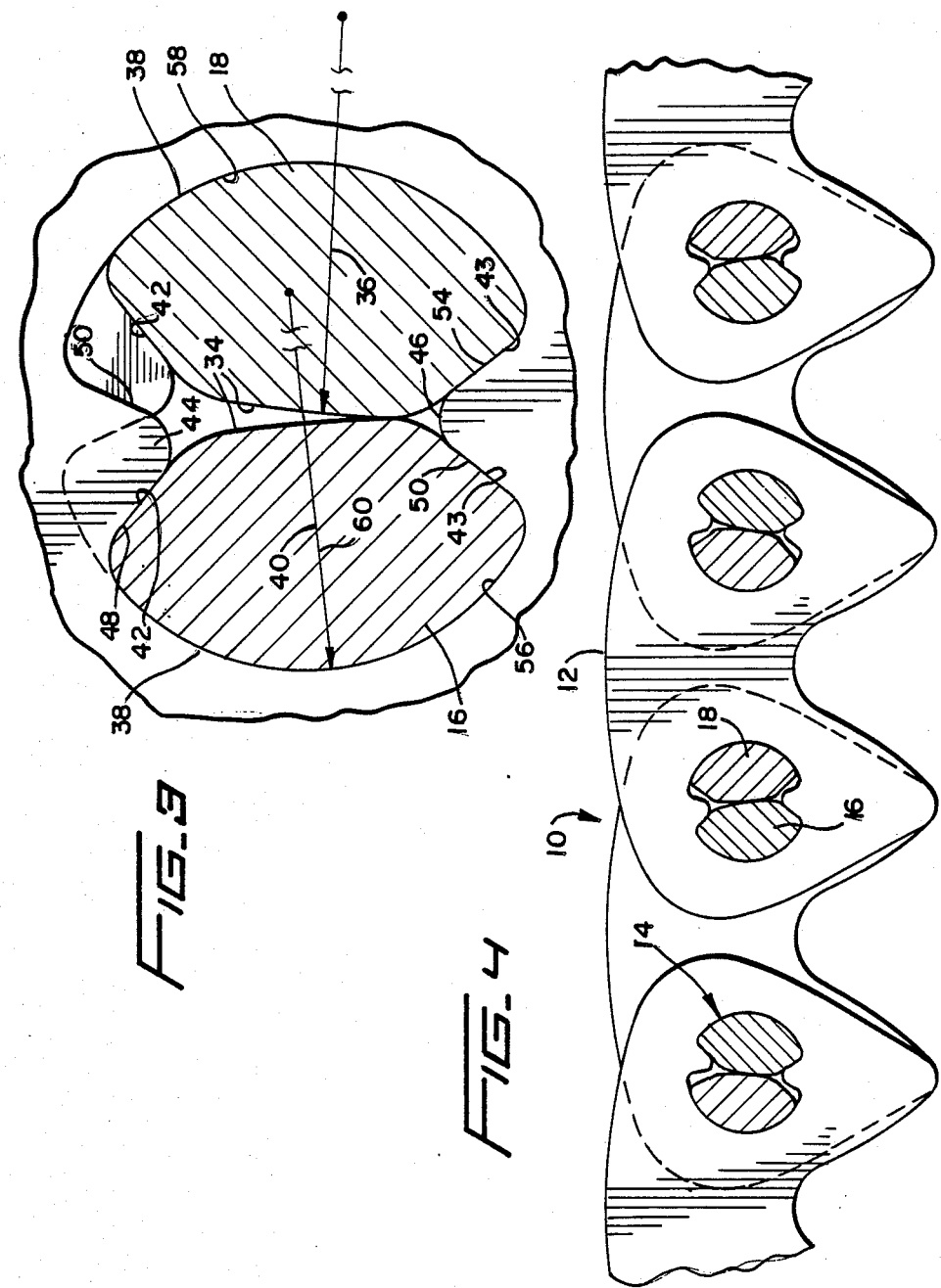

ROCKER JOINT FOR CHAIN

BACKGROUND OF THE INVENTION

1. FIELD OF THE INVENTION

This application relates to power transmission chains and particularly to an improved rocker joint for such chains.

2. BACKGROUND DISCUSSION

Power transmission chains of the "silent" or inverted tooth variety usually comprise a plurality of sets of transversely aligned links which are interleaved with other sets of links. Each link has a body with a pair of spaced openings and the openings of one set of links are arranged and aligned with the openings of the next adjacent set of interleaved links. To join the interleaved sets of links, a pivot means is inserted into each group of aligned openings. As taught in the prior art, round pins and rocker joints have been used, the rocker joints comprising a pair of pins, or a pin and a rocker, each with a front face which contacts and rocks on the other. Each link of a silent chain, with the exception of guide links which do not mesh with sprocket teeth, has a body and a pair of depending toes separated by a crotch, each toe being defined by flanks which diverge toward the body. It is also conceivable to construct a chain with links similar to those of the American or British standard roller chain, but with interleaved links. The ultimate use of a chain dictates its construction.

Rocker joints for chains are well known in the prior art, as for example, U.S. Pat. Nos. 1,534,494; 3,540,302; 3,747,776; 4,010,656 and 4,507,106.

U.S. Pat. No. 1,534,494 teaches a power transmission chain in which the links have generally circular openings, each with a pair of inwardly directed tabs defining a pair of arcs of different lengths, and each set of openings receiving a pair of pins having generally curved backs and ogee fronts which rock on one another as the chain articulates.

U.S. Pat. No. 3,540,302 shows a chain having a rocker joint comprising a pair of like members, each member having a rocking surface in rocking contact with the other. The rocking surface of each is defined by a first radius, while the remainder of the member is defined by a surface of a second and smaller radius. Both surfaces are convex. The openings in the links for receiving each member are generally rectangular, and each joint member has spaced notches in which the link members seat to transmit the working load to the assembly.

U.S. Pat. No. 3,742,776 discloses a silent chain with a rocker joint comprising a pair of like members, each having a rocking surface engaging the other. The rocking surfaces are defined by a first radius, while the back surfaces of each member are defined by a second and smaller radius. The rocking and back surfaces are joined by planar or straight surfaces. The links of the chain have openings formed of inner and outer circular segments joined by wall segments which define straight chords of a circle. The members of the rocker joint are wedged into the openings of a set of links, such that a space is left between the back surface of the joint members and the walls of those openings.

U.S. Pat. No. 4,010,656 relates to a chain constructed of sets of interleaved links, each link having a pair of spaced, smooth walled, ovoid openings. The rocker joint comprises a pair of members each with a hypotrochoidal cross-sectional shape, i.e., they are generally three sided, each side having a convex surface. The members substantially match the shape of parts of the openings and engage those parts with a pair of its defining convex surfaces.

U.S. Pat. No. 4,507,106 teaches a rocker joint in which each pin or rocker of a pair has the identical cross-section, and in which each is defined by a front working surface of one radius and a back surface defined by second and third radii. Both of the radii defining the back surfaces are progressively smaller than the first radius, and an even smaller radius joins the front and back surfaces. The openings in the links are essentially round with smooth uninterrupted walls. While the rear surface matches a portion of the wall of the openings, the pins at times have a tendency to rotate relative to the opening which is not desirable.

When constructing a power transmission chain, it is common practice to make one of the pins of a rocker joint longer than the other. The shorter pin is trapped in position by the guide links which flank the sides of the chain while the longer pins are press-fitted or otherwise secured in the guide links. In other chains, the guide links are located centrally of the links. In any event, the guide links are used to maintain the engagement of the chain with the sprocket or sprockets with which the chain meshes and do not serve to transmit power to or from the sprockets.

BRIEF SUMMARY OF THE INVENTION

The present invention comprises an improved rocker joint construction suitable for use in power transmission chains. The general construction of such chains has been described.

The improved rocker joint of this invention comprises a pair of pins having substantially identical cross-sectional shapes. A pair of these pins is received in each group of transversely aligned openings in the interlaced sets of links which make up the chain, the openings in one set of links retaining one pin against rotation relative to the links of that set while permitting limited movement and rotation of the other pin relative to the opening of that set of links. The other pin is retained against rotation in the aligned openings of the next adjacent interleaved set of links while permitting movement and rotation of the one pin relative to the openings in the latter set of links. With this fit, the front, working surfaces of the pair of pins engage and rock on the other.

The openings in the links each comprise a pair of arcs, one longer than the other, the arcs being separated by lugs extending inwardly of the openings and which are defined by generally planar converging surfaces. One pin of each pair of pins is held so that its back surface contacts the opening's shorter arc and the walls of the defining lugs, while the other pin does the same with the openings of the next adjacent and interleaved set of links.

Each pin is defined by four major surfaces, i.e., a front or working surface defined only by a first radius, a rear or back surface defined only by a single radius smaller than the first radius, and planar surfaces or walls diverging from front to back joining the front and rear surfaces.

BRIEF DESCRIPTION OF THE DRAWINGS

FIG. 1 is a longitudinal view of a portion of a chain constructed according to this invention with parts broken away to show details;

FIG. 2 is a plan view of a typical chain link according to this invention;

FIG. 3 is an enlarged end view of a rocker joint comprising a pair of pins and within the openings in the interleaved sets of links according to this invention; and FIG. 4 is an view of a portion of a chain on an enlarged scale showing the joint of this invention.

DETAILED DESCRIPTION OF THE PREFERRED EMBODIMENT

Looking now at the drawings, and especially FIG. 1, there is illustrated a chain 10 of the "silent" variety which comprises interlaced sets of links 12 joined by pivot means 14, the pivot means comprising a rocker joint having a pair of pins 16 and 18, (sometimes referred to as a pin and a rocker). The links 12 (see FIG. 2) have a body 13, a pair of spaced openings 20 to receive the pivot means 14, and a pair of toes 22 defined by outside and inside flanks 24, 26, respectively, the inside flanks being joined by a crotch 28. Guide links 30 flank the sides of the sets of links and function to maintain the chain on the sprocket or sprockets (not shown) with which the chain meshes. In this construction, the pins 16 extend through openings 32 and are usually peened over or upset at their ends, while the pins 18 are shorter in length and are trapped by the guide links. The guide links can be centrally located in a chain, if so desired. In such construction the central guide links ride in a central groove in the sprockets to insure the meshing of the chain and the sprockets and both the pin and rocker are peened over, upset at their ends, or otherwise secured in the assembly.

As illustrated in FIGS. 3 and 4, the cross-sectional shape of the pins 16 and 18 is substantially identical. The pins can be cut from an extruded length of metal stock. As previously stated, the pin 16 may be longer than the pin 18.

Each pin 16 and 18 has a front or working surface 34 defined only by a first radius 36, a back or rear surface 38 defined only by a single radius 40 smaller than the radius 36, and generally planar surfaces 42, 43 which diverge from the front surface to the back surface, thus joining the front and back surfaces. The surfaces 42, 43 are substantially alike in their lengths and angular relationship relative to an imaginary centerline passing through the centers of the back and front surfaces.

The openings 20 in each link are mirror images of one another and are generally circular with a pair of inwardly extending lugs 44, 46, each defined by converging surfaces 48, 50 and 52, 54. The lugs are separated by a pair of arcs 56, 58, the arc 56 being smaller than the arc 58 and positioned outwardly of the center of the link toward the ends thereof. The radius 60 of the smaller arc 56 substantially matches the radius 40 of the pin 16, and the surfaces 48, 50 substantially match the surfaces 42, 43 of a pin. When a pair of pins 16 and 18 is inserted in an opening 20, as illustrated in FIGS. 3 and 4, the back surface of one pin engages the arc 56 and also the planar surfaces 42, 43 contact the surfaces 48, 50. Because of the fit of the pin in the opening, that pin does not and cannot rotate relative to the link in the opening. The other arc 58 and lug surfaces 52, 54 permit the other pin of the pair of pins to rock on the pin 16 held against rotation, to thus permit articulation of the chain without permitting back-bending of the chain.

The pin 18 has the same relationship with the openings 20 in the next adjacent interlaced set of links, it being held against rotation with respect to that set of links but movable with respect to the next adjacent set of interlaced links.

The appended claims are intended to cover all reasonable equivalents and are to be interpreted as broadly as the prior art will permit.

What is claimed:

1. A rocker joint for a power transmission chain constructed of an assembly of links and pivot members, the chain comprising a plurality of sets of links interleaved with other sets of links, each link having ends and a central body portion and a pair of generally round and spaced openings each of which has a wall defined by a pair of arcs separated by spaced and generally inwardly extending lugs, each lug being defined by a pair of diverging substantially planar walls, said lugs being spaced such that one of the arcs is smaller than the other arc, said pivot members comprising a pair of pins having substantially identical cross-sectional shapes with front convex working surfaces engaging and rocking on one another, each pin of a pair of pins having the working front surface defined only by a first radius, and a convex back surface defined only by a second radius matching that of said smaller arc of said opening, said first radius being larger than said second radius, the front and back surfaces being joined by generally planar surfaces which diverge from the front surface to the back surface, one of said pins of a pair of pins being received in the openings of one set of links between a pair of the lugs thereof such that its back surface engages the surface defined by said smaller arc and its planar surfaces engage the planar surfaces of the adjacent lugs, thereby preventing rotation of said pin relative to the links of that set, the other pin of said pair of pins being received in the openings of the interleaved set of links with the same relative relationship with said openings as said one set of links, the back surfaces of said pins being movable in the other openings of the links as the working front surfaces move relative to one another when the chain articulates about its joints.

2. A rocker joint for a power transmission chain as recited in claim 1, wherein said planar surfaces of said pins are substantially equal in length.

3. A rocker joint for a chain constructed of an assembly of links and pivot members, which chain comprises a plurality of sets of links interleaved with other sets of links, each link having a pair of spaced openings, each opening being defined by a pair of arcs, one of which has a smaller length than the other, the smaller arc being positioned outwardly of the center of the links, the lengths of said arcs being defined by the defining walls of substantially identical lugs which converge and extend inwardly of said openings and short of the center thereof, said lugs being defined by generally planar walls, one set of openings of one set of links being transversely aligned with the openings in another set of openings in the next adjacent set of interleaved links to thus form groups of aligned openings, a pair of pivot members in each group of aligned openings to both join the sets of links and to permit articulation of the chain, each pivot member having a convex front working surface and a convex back surface, the front working surfaces of each pivot member of a pair of pivot members opposing and rocking on one another and being defined only by a first radius, the back surface of each pivot member being defined only by a single second radius smaller than that of said front surface, the front and back surfaces of each pin being joined by substantially planar surfaces which diverge from the front to the back, each back surface having a shape matching that of the smaller arc of said openings so as to engage the wall of the openings in one set of links which have the smaller radius and with the planar walls of said pin engaging the planar walls of said lugs defining the smaller arc, thus preventing rotation of the pins so engaged when the chain articulates, the other of said pins of the pair of pins being free of engagement with the walls of said openings engaged by the other pin of the pair of pins, the pins of said pair of pins having the same relationship with the openings in the next adjacent set of links which is interleaved with said one set of links.

4. A rocker joint as recited in claim 3, wherein said walls of said lugs defining the larger arc limit the rotational movement of the other pin of the pair of pins.

5. A rocker joint as recited in claim 3, wherein said pin-opening configuration limits the back-bending ability of the chain.

* * * * *